May 2, 1944.　　　　　L. I. KOMIVES　　　　　2,347,912
METHOD OF INSTALLING ELECTRIC CABLES
Filed March 11, 1941　　　5 Sheets-Sheet 4
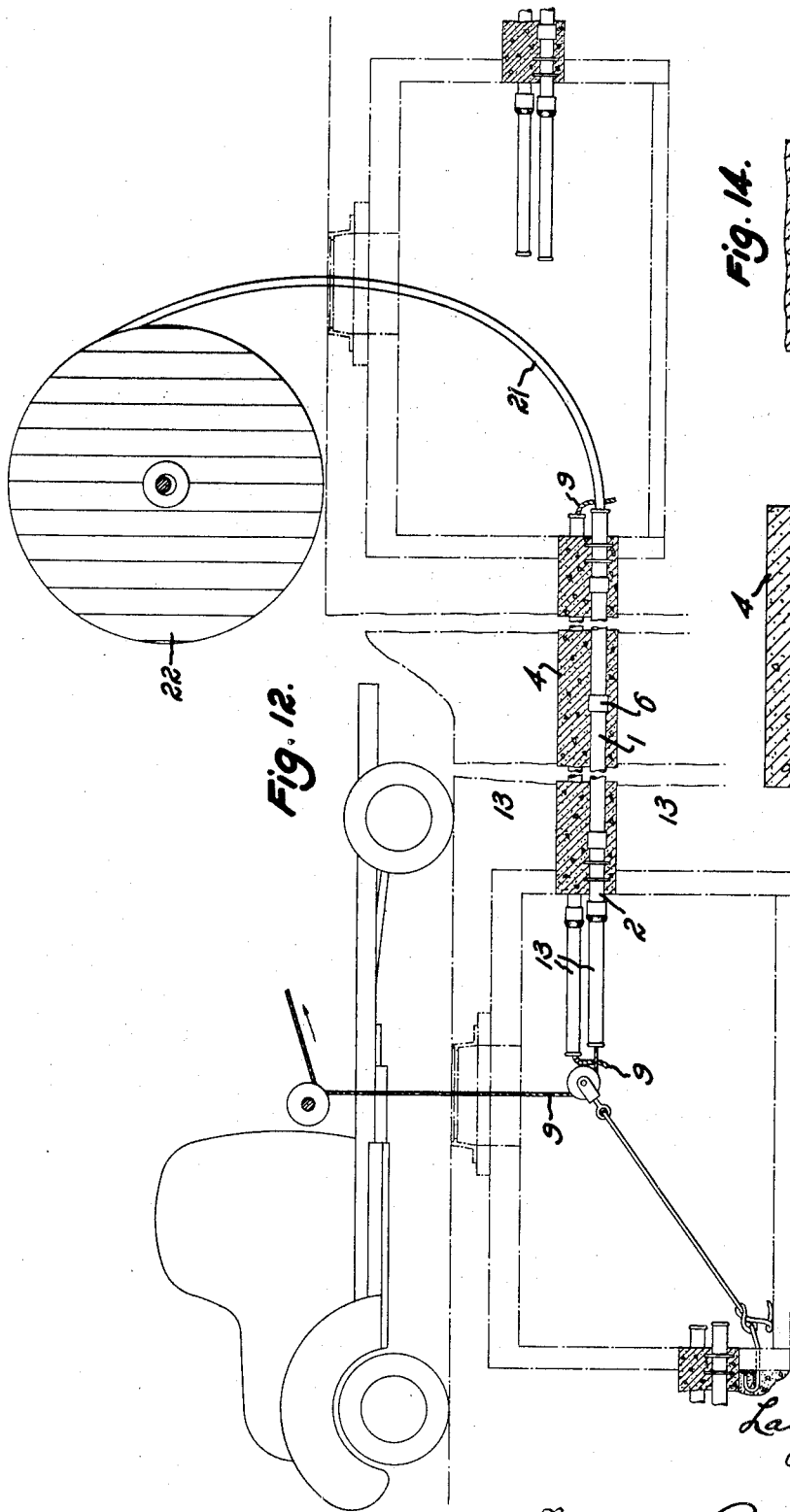
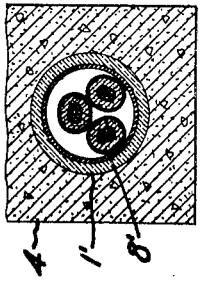
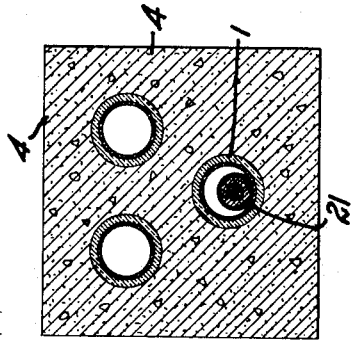
Inventor:
Laszlo I. Komives,
By Pierce-Scheffler,
Attorneys.

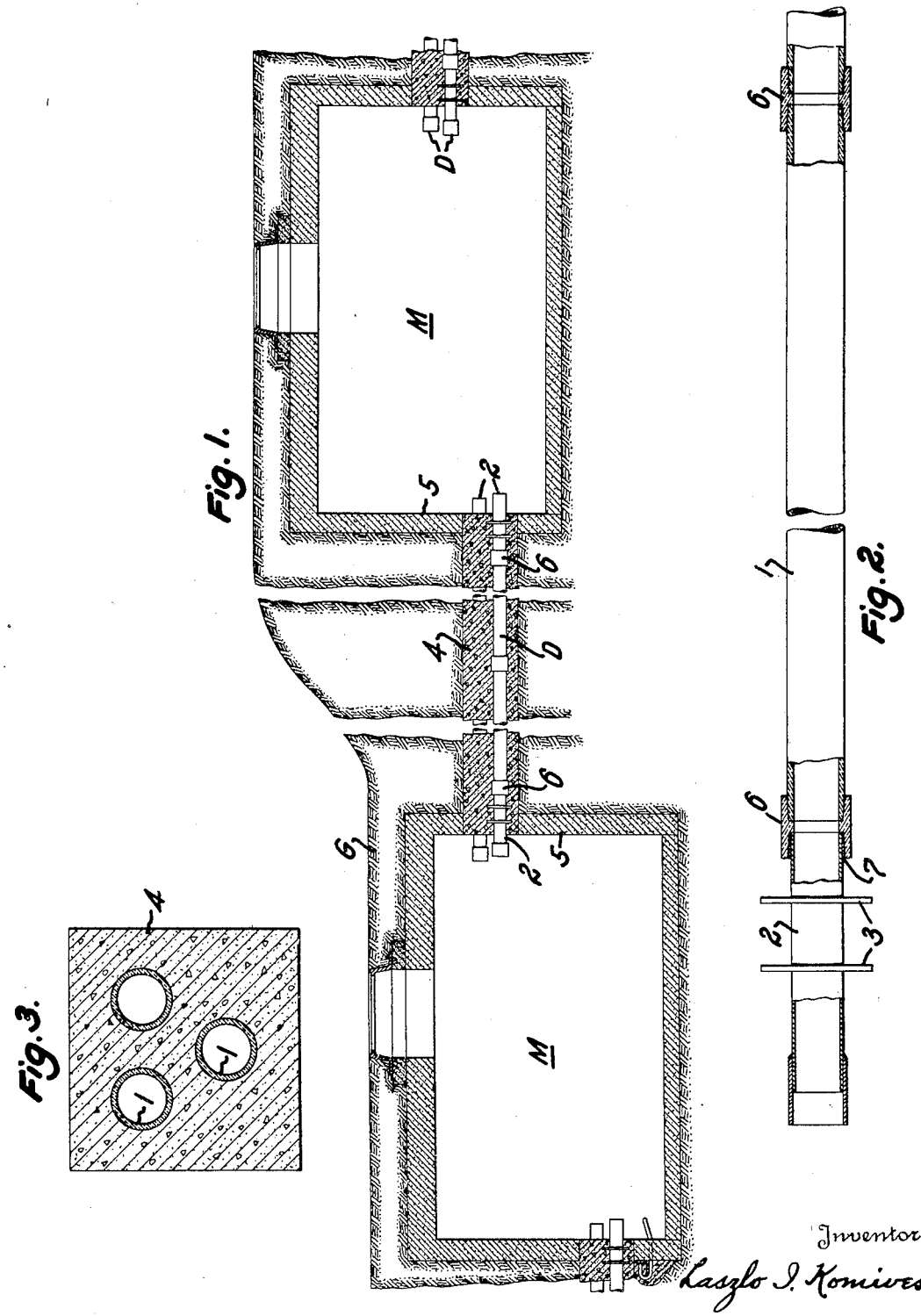

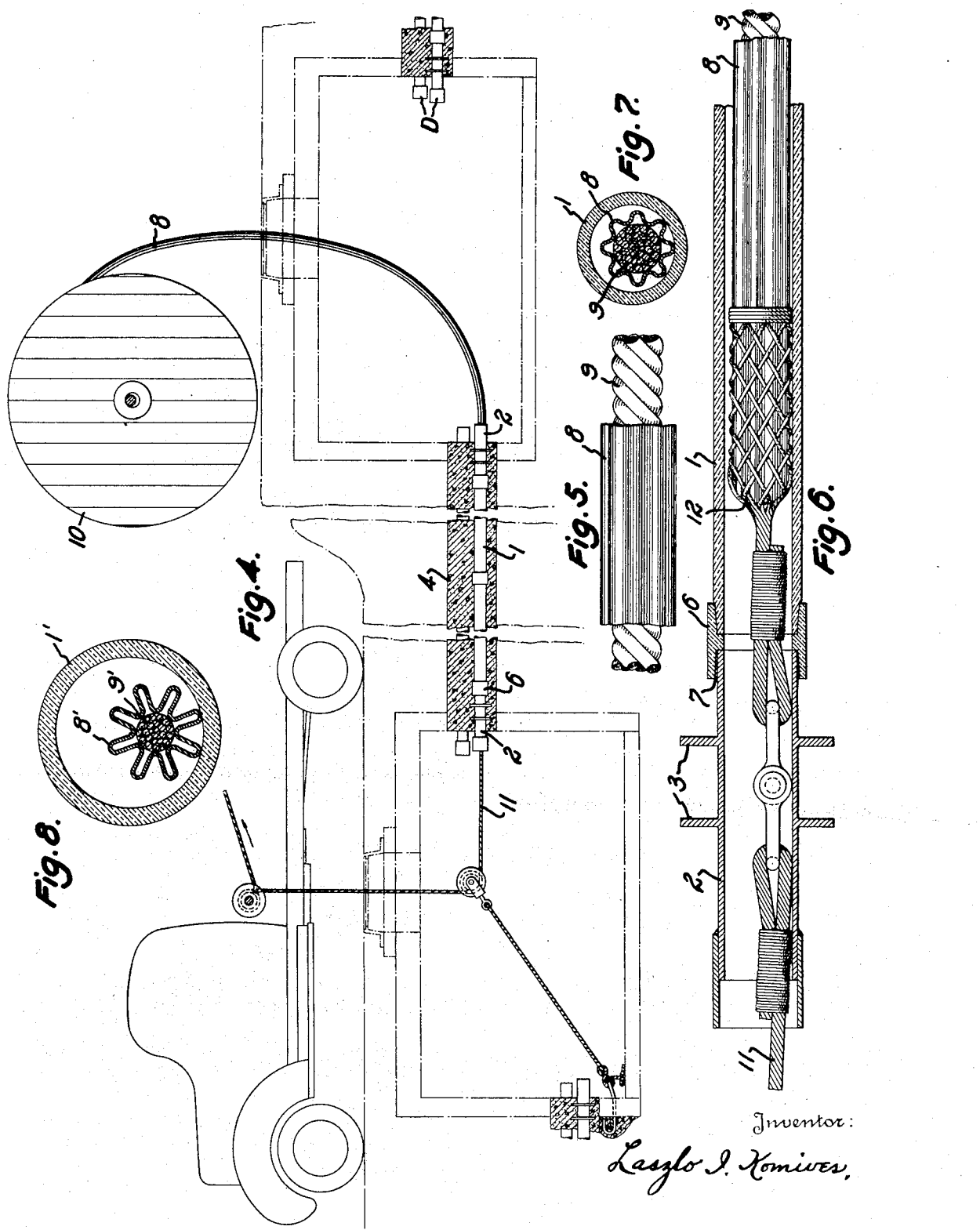

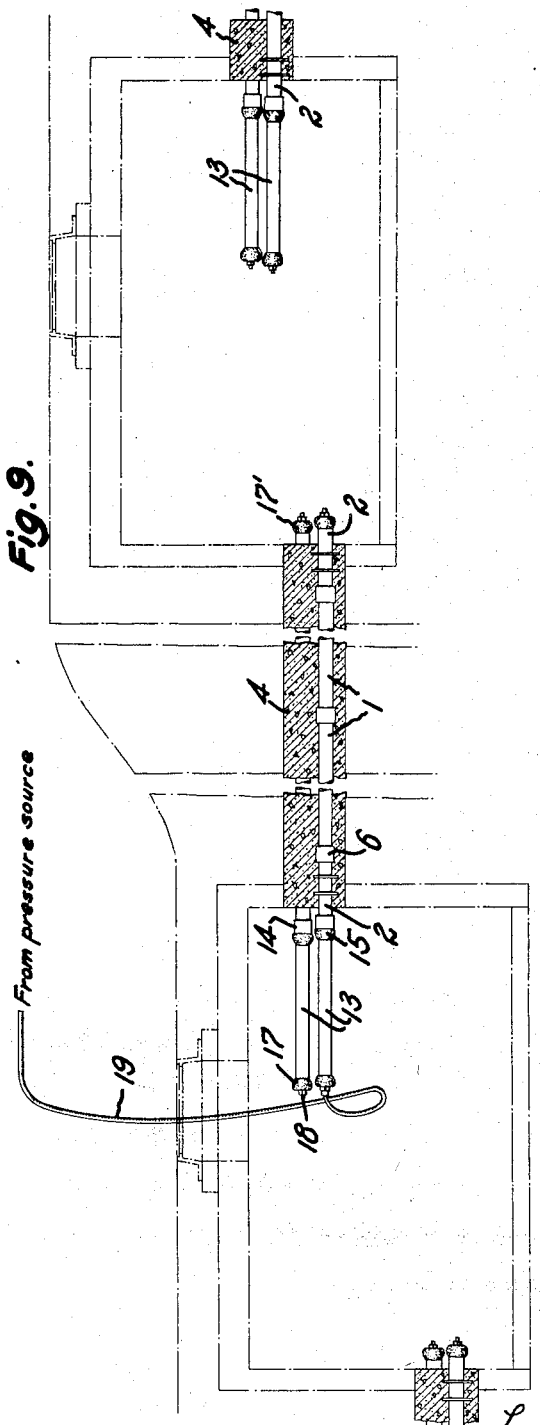
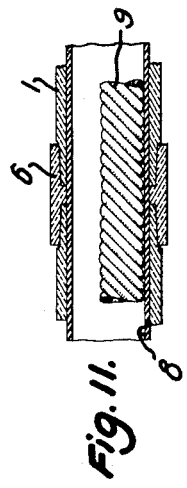
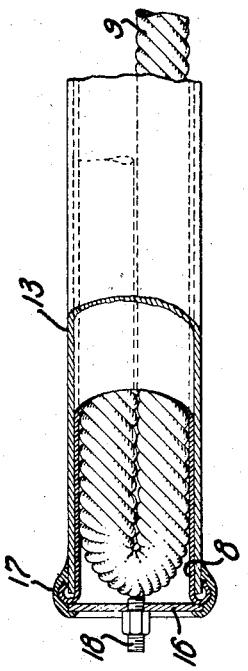

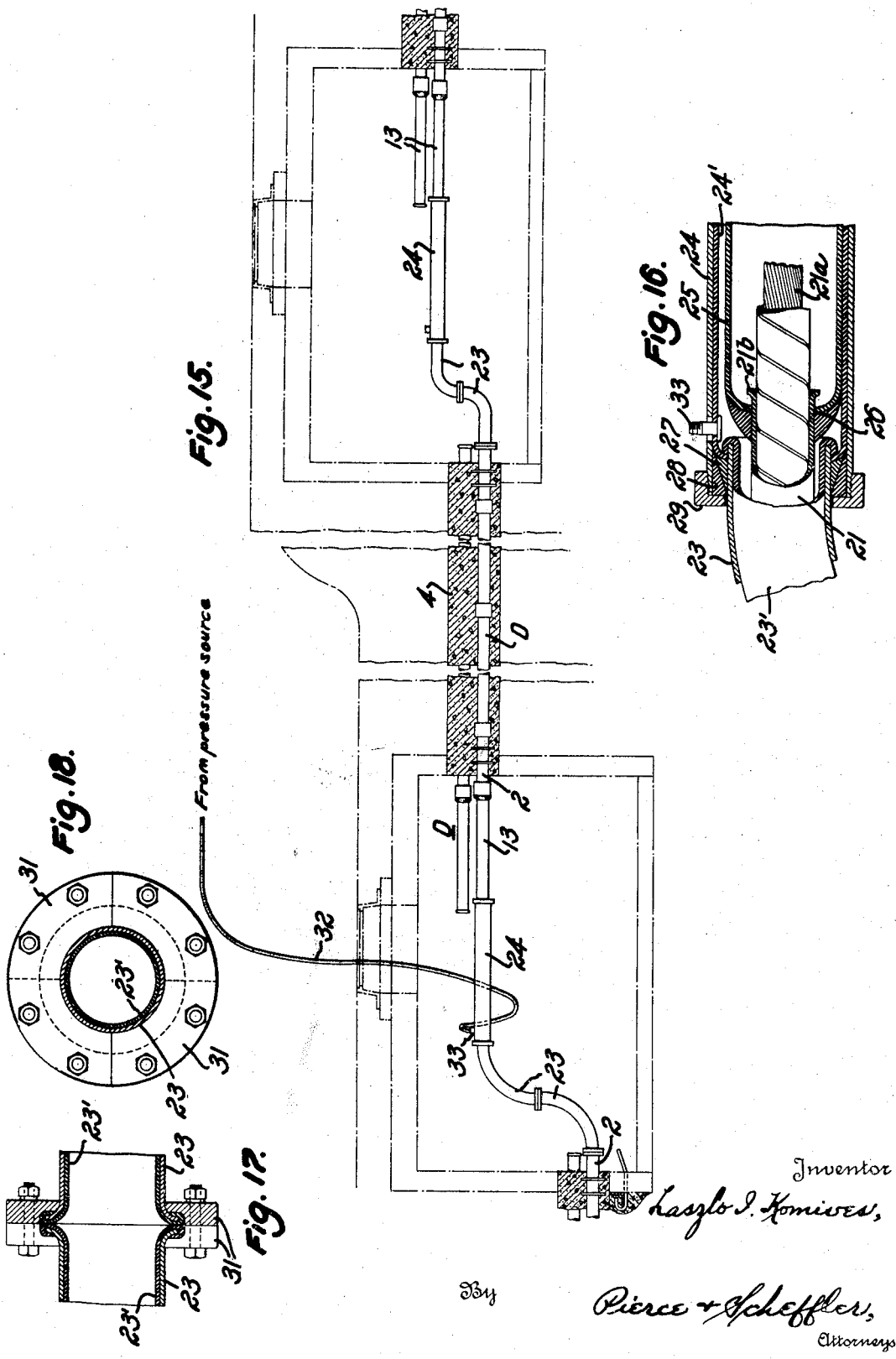

Patented May 2, 1944

2,347,912

UNITED STATES PATENT OFFICE 2,347,912

METHOD OF INSTALLING ELECTRIC CABLES

Laszlo I. Komives, Detroit, Mich., assignor to The Detroit Edison Company, Detroit, Mich., a corporation of New York Application March 11, 1941, Serial No. 382,816

4 Claims. (Cl. 29—162)

This invention relates to methods of installing electric cable systems, particularly so-called pressure systems in which an insulated cable is installed in a rigid duct or pipe and is maintained under a heavy fluid pressure to prevent the development of voids within the cable sheath.

Various arrangements have been proposed for pressure cable systems and, in one general type, an insulated cable is installed in a steel or iron pipe of sufficient strength to withstand pressures of the order of 200 pounds per square inch. The electric cable may be of the conventional type that includes an outer lead sheath that is tightly compressed upon the insulation or, according to other proposals, the outer lead sheath may be omitted. The steel or iron pipe of such a pressure cable system must be protected against corrosion by ground waters and electrolysis as metal pipes installed underground are subject to relatively rapid destruction, particularly in urban districts when located underground between street car tracks. Adequate protection against this corrosion of steel and iron pipes is difficult to attain and, at best, is relatively expensive.

Objects of the invention are to provide methods of installing pressure cable systems by forming a rigid duct of a series of preformed pipe sections of a relatively impervious cementitious material, drawing into the duct a lead tube that is radially collapsed upon a reinforcing rope core, expanding the lead tube by air pressure to form an impervious lining for the duct, and employing the rope core to draw one or more electric cables into the lined duct.

These and other objects and advantages of the invention will be apparent from the following specification when taken with the accompanying drawings in which:

Fig. 1 is a fragmentary vertical section through a portion of the duct system of a three-phase pressure cable embodying the invention;

Fig. 2 is a fragmentary side elevation, partly in section, of one of the ducts of the cable system;

Fig. 3 is a transverse section through the ducts;

Fig. 4 is a vertical section, similar to Fig. 1, illustrating the step of drawing the lead lining into the duct system;

Fig. 5 is a fragmentary side elevation, on an enlarged scale, of the lead lining collapsed upon its reinforcing rope core;

Fig. 6 is a vertical section, on an enlarged scale, of the duct and the traction system for drawing the collapsed lead lining into a duct;

Fig. 7 is a transverse section through a duct and the collapsed lead lining;

Fig. 8 is a similar transverse section illustrating a modified lead lining and rope core for use in a duct of a substantially larger diameter than that of the collapsed lead lining;

Fig. 9 is a vertical section of the duct system illustrative of the step of expanding the lead lining within the duct;

Fig. 10 is an enlarged vertical section through the duct and lead lining, and illustrating the mechanism for applying pressure to the lead lining to expand the same;

Fig. 11 is a fragmentary vertical section through the duct after the expansion of the lead lining;

Fig. 12 is a fragmentary vertical section through the duct system and illustrating the step of drawing an electric cable into one of the lead-lined ducts;

Fig. 13 is a transverse section through the partially installed cable system, as seen on the plane indicated by line 13—13 of Fig. 12;

Fig. 14 is a similar transverse section through an alternative construction in which a multiple conductor cable is installed in a single duct;

Fig. 15 is a somewhat diagrammatic vertical section illustrating one completed unit of a multiple duct cable system;

Fig. 16 is an enlarged vertical section through a joint in the cable and duct system; and Figs. 17 and 18 are fragmentary longitudinal and transverse sections of couplings in the duct system.

In the drawings, the successive steps in the installation of an underground cable system embodying this invention are shown in Figs. 1, 4, 9, 12 and 15. The general arrangement conforms to current practice in that the cable is installed in sections that extend between adjacent manholes M and are connected to each other in the manholes. The manholes may be of the usual reinforced concrete type and located below the ground level G at intervals of up to several hundred feet in accordance with design requirements determined by existing streets and buildings, and by the maximum length of cable that can be drawn from one manhole to another. In the embodiment illustrated in the main views, individual ducts for each cable of a multiphase electrical distribution system extend between adjacent manholes, the ducts being identified generally by reference characters D. The ducts are installed in the usual manner in tunnels or open ditches that are then filled in.

In accordance with this invention, each duct comprises a series of alined concrete pipe sections 1 of a dense and mechanically strong type such as the cement and asbestos compositions sold under the trade-mark "Transite," and terminal pipe sections 2 of brass or other non-magnetic tubing having radial flanges 3 for anchoring the duct in the mass of concrete 4 that is poured around the several ducts and bonded to the walls 5 of the adjacent manholes M. The concrete pipe sections 1 are of convenient length for shipping and installing, for example about 10 feet long, with walls about ½" thick and an internal diameter of from about 3" to 5", depending upon the dimensions of the electric cable that is to be installed. The cement-asbestos concrete pipes are somewhat permeable to water but are not porous, and the composition may be machined or cut to provide accurately formed end surfaces for the formation of tight smooth-walled joints. The coupling members 6 fit over the tapered ends of the adjacent pipe sections 1 and have a central internal rib of the same inside diameter as the pipe sections 1. At the joints between the metal tubes 2 and the concrete pipe, the conical space between the metal tube and the tapered bore of the coupling 6 is packed with lead or other sealing material.

The second step in the installation of the cable system is illustrated in Fig. 4. A lead lining for the ducts is initially formed as a fluted lead pipe 8 that is extruded upon a rope core 9, see Figs. 5 and 7, and wound on a reel 10 in the same manner as the usual electric cables. A traction cable 11 is "fished" through a duct and secured by a coupling lacing 12 to the end of the lead pipe-rope cable. The rope core reinforces the lead pipe and prevents sharp bends or buckling when the lead pipe is drawn through the duct by the traction cable 11.

The lead pipe 8 is drawn well beyond the end of the metal tube 2 and another metal tube 13 is slipped over the end of the lead pipe and secured to the end of metal tube 2 by a coupling sleeve 14 and wiped joint 15, see Fig. 9. The end of the lead pipe 8 is expanded and turned back over the end of the metal tube 13, and the end of the rope core 9 is doubled back inside of the expanded lead pipe, Fig. 10. An end cap 16 is secured over the end of the tube 13 by a wiped joint 17, and a short pipe section 18 extends through the cap and is adapted to receive a flexible pipe 19 that extends to a gas cylinder or source of pressure, not shown. The opposite ends of the lead pipes 8 are expanded over the ends of the metal tubes 2 in the adjacent manhole, and the lead pipes and tubes are temporarily sealed by caps and wiped joints 17'.

Pressure gas such as air or nitrogen is then admitted to the duct to unfold the flutes of the lead pipe 8 to form a lead lining for the duct. The circumferential length of the fluted pipe 8 is so selected, with respect to the internal diameter of the duct, that there is little or no circumferential elongation of the lead pipe when it is expanded by an internal pressure of from about 40 to 70 pounds per square inch.

As shown in Fig. 8, the lead pipe 8' is deeply fluted and may have an outer diameter of the order of three times that of the central rope core 9' when the duct 1' is of relatively large diameter to receive a multiphase electric cable. The circumferential length of the pipe 8' must be equal or approximately equal to the circumference of the duct section to be lined as the fluted lead pipe must be unfolded into engagement with the duct with no appreciable circumferential elongation of the lead lining. The variations in the thickness or internal structure of the lead pipe will result in blowouts or the formation of "blisters" at the regions of lower tensile strength. Lead sheets and pipes are of non-uniform composition and thickness as originally manufactured, and any stretching accentuates the variations in thickness of the non-homogeneous material.

The "blowing up" of the lead pipes completes the formation of the duct, and the next step is to draw in the electric cable 21. The rope core 9 is loose within the lead-lined duct, as shown in Fig. 11, and is used as the traction cable for drawing the electric cable from its reel 22, see Fig. 12. The electric cable 21 has the usual wrapping of oil impregnated paper or fabric tape, and may have an outer sheath of lead or a metal reinforcing wrapping. Only a single cable 21 is shown in the transverse section, Fig. 13, and it is to be understood that the other cables of the three-phase system are drawn into their ducts by the rope cores 9 that reinforce the collapsed lead linings of those ducts.

In an alternative construction, as shown in transverse section in Fig. 14, a multiple conductor cable is installed within a single large diameter concrete pipe 1' with a lead lining 8', as shown in Fig. 8. The cable may be of the lead sheathed type with conductors of oval cross-section, such as described in my prior Patent No. 2,227,503, granted Jan. 7, 1941, but it is usually preferable to employ a cable in which three oval-shaped conductors 23 with individual oil impregnated wrappings of paper or fabric are twisted into an unarmored cable.

Reverting to the multiple duct construction shown in the principal views, the sections of the cable 21 that extend between adjacent manholes are electrically connected to each other and enclosed within metal tubes 23, 24 that connect the terminal metal tubes 2 of lead-lined concrete duct sections. The tube 24 is telescoped over the tube 13 before the ends of adjacent cable sections are joined by a splice 21a that is then covered by a sleeve 25 that is secured to the cable sheath 21b by a wiped joint 26. The tube 24 is then slipped over the sleeve 25, and the lead linings 23', 24', of the tubes 23, 24, are sealed upon each other by a lead packing 27 that is compressed upon the tube 23 by a split cone 28 and a nut 29 that threads upon the tube 24. Hermetically sealed joints between the tubes 23 may be formed, as shown in Figs. 17 and 18, by extending the lead linings 23' over the outwardly flared ends of tubes 23, and sectional clamping disks 31 that are bolted together to compress the lead linings upon each other.

A high pressure is to be maintained within the ducts to prevent the formation of voids or gas pockets that would reduce the efficiency of the insulating wrapping upon the conductors. Pressures of the order of 200 pounds per square inch may be employed when the duct sections 1 are "Transite" pipe with a wall thickness of about ½ inch and outer diameter of from 4 to 5 inches, and the minimum thickness of the concrete bedding 4 about the ducts (see Fig. 3) is about 3 inches.

For purpose of illustration, the means for establishing a high pressure with the ducts is shown diagrammatically in Fig. 15 as a pipe or tube 32 that extends from a coupling 33 on the tube 24 to a pressure source, not shown, that may be a cylinder of compressed air, nitrogen or other inert gas. Only one duct system is shown in completed form in Fig. 15, for clarity of illustration; and it is to be understood that conductors are installed in the other duct sections, spliced to each other and housed within metal pipes coupling the lead-lined concrete duct sections, and subjected to high fluid pressure from any appropriate pressure source.

The lead-lined concrete duct system has several advantages over the prior steel or iron pipes that have been used, or proposed, for pressure cable systems. The initial cost of the lead-lined concrete duct is somewhat less than that of the protected metal pipe duct, and it eliminates the necessity for a careful formation of fluid-tight joints between a multitude of pipe sections. Furthermore, the lead-lined concrete duct is resistant to attack by ground water and eliminates the special anti-electrolysis coatings that are required for iron and steel pipes. The lead sheathing of conventional cables may be attacked by ground water and electrolysis when buried in the ground, but the dense and but slightly permeable asbestos-cement duct shields the lead lining from the ground water and thus restricts the destructive action to a negligible value.

It is to be understood that the invention is not limited to the particular values that have been specified with reference to one practical embodiment of the invention. Relative costs and simplicity of installation may make it desirable in some cases to employ pipe sections with thick walls that eliminate the necessity for an outer jacket or bedding of concrete. Tubes of molded plastics, or of laminated fabric or plywood bonded by a resin, may be substituted for the illustrated asbestos-cement pipes and may be used either with or without reinforcement by an outer jacket of concrete, according to the relative strength of the tubing and the pressure to be established within the duct. The internal diameter of such tubing can be held within close limits and the inner wall surface is smooth and highly polished, thus facilitating the installation of the lead lining. For use above ground or at other locations where there is no danger of attack by ground water, the duct lining may comprise a copper tube that is initially formed as a fluted pipe on a rope core, and then installed and expanded in the manner described above with reference to the lead lining.

It is therefore to be understood that the invention is not limited to the particular apparatus and operations herein shown and described, and that various changes that may be made fall within the spirit of my invention as set forth in the following claims.

I claim:

1. The process of constructing a hermetically-sealed, pressure-resistant duct which comprises assembling a plurality of insulating pipe sections in axial alinement to form a duct, drawing into the duct a fluted lead pipe collapsed upon a rope core, unfolding the collapsed lead pipe to form a lead lining for the duct, and removing the rope core from the lined duct.

2. The process of constructing a pressure electric cable system which comprises assembling a plurality of tubular pipe sections of a relatively dense semi-permeable insulating material in axial alinement to form a duct, drawing into the duct a lead pipe collapsed upon a rope core, unfolding the collapsed lead pipe to form a lead lining for the duct, drawing an insulated electric cable into the lead-lined duct by said rope core, sealing off the lead-lined duct, and establishing a fluid pressure within the lead-lined duct to increase the efficiency of the insulation on said cable.

3. The process of constructing a pressure electric cable system that comprises assembling a plurality of ducts by arranging in axial alinement a plurality of pipe sections of a relatively dense semi-permeable insulating material, drawing into each duct a lead pipe collapsed upon a rope core, unfolding the collapsed lead pipes to form lead linings within the several ducts, drawing insulated conductors in each duct by means of said rope cores, sealing off the lead-lined ducts, and establishing a fluid pressure in the ducts to increase the efficiency of the insulation of said cables.

4. The process of constructing a pressure cable system that comprises assembling a plurality of insulating pipe sections of a relatively dense semi-permeable material in axial alinement to form a duct, drawing into said duct a lead pipe collapsed upon a rope core, unfolding the lead pipe to form a lead lining for said duct, drawing into the lead-lined duct a multiple conductor insulated cable by means of the rope core, sealing off the lead-lined duct, and establishing a fluid pressure within the duct to increase the efficiency of the insulation of said cables.

LASZLO I. KOMIVES.